United States Patent [19]

Ephraim et al.

[11] Patent Number: 5,058,814
[45] Date of Patent: Oct. 22, 1991

[54] COFFEE GRINDER

[75] Inventors: Daniel R. Ephraim, Glencoe; Philip C. Ephraim, Evanston, both of Ill.

[73] Assignee: Modern Process Equipment, Inc., Chicago, Ill.

[21] Appl. No.: 564,388

[22] Filed: Aug. 8, 1990

Related U.S. Application Data

[63] Continuation-in-part of Ser. No. 394,553, Aug. 16, 1989, Pat. No. 4,967,649.

[51] Int. Cl.$^5$ .................................................. A47J 42/16
[52] U.S. Cl. ................................... 241/152 A; 99/286; 241/261.2
[58] Field of Search ................ 241/100, 152 A, 261.2, 241/261.3; 99/284, 286, 287, 290, 295

[56] References Cited

U.S. PATENT DOCUMENTS

| | | | |
|---|---|---|---|
| 3,761,027 | 9/1973 | Mendoza | 241/261.3 |
| 3,827,640 | 8/1974 | Marrie | 241/100 |
| 4,060,206 | 11/1977 | Granzow | 241/259.1 |
| 4,555,984 | 12/1985 | Yamashita | 99/286 |
| 4,605,175 | 8/1986 | Weber | 241/261.2 X |
| 4,641,572 | 2/1987 | Varga | 99/286 |
| 4,659,023 | 4/1987 | Frei et al. | 241/100 X |
| 4,821,966 | 4/1990 | Ephraim et al. | 241/55 |

OTHER PUBLICATIONS

Bunn-O-Matic Corp., Manual, Precision Coffee Grinder, Model G9, Copyright 1984—16 pages including covers.

Primary Examiner—Mark Rosenbaum
Assistant Examiner—Frances Chin
Attorney, Agent, or Firm—Dressler, Goldsmith, Shore, Sutker & Milnamow, Ltd.

[57] ABSTRACT

A grinder for coffee beans, comprising a hopper, two grinding burrs arranged for relative rotation about a vertical axis, and a chamber defined by walls including an outer wall and a lower plate, which has two outlets. At each outlet, a flexible blade mounted to such outlet closes such outlet until coffee grounds in the chamber are pressed downwardly with sufficient force to flex the blade. A rotor arranged to sweep in the chamber has portions having inclined faces whereby grounds being swept tend to be downwardly pressed. Each outlet is configured to direct grounds downwardly and radially. The outer wall is relieved to define two spiral configurations countering tendencies of the grounds to rotate as an annular mass.

11 Claims, 3 Drawing Sheets

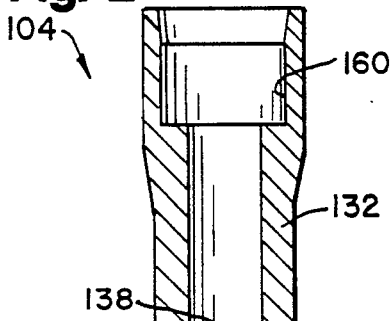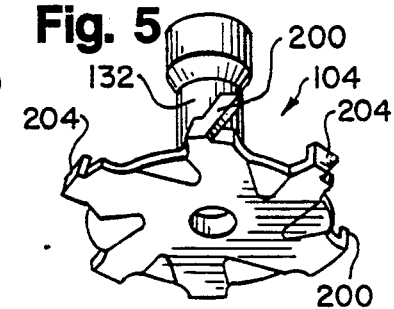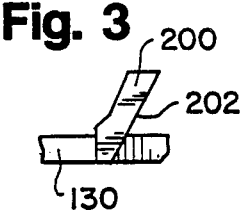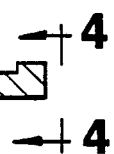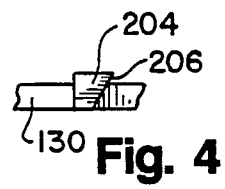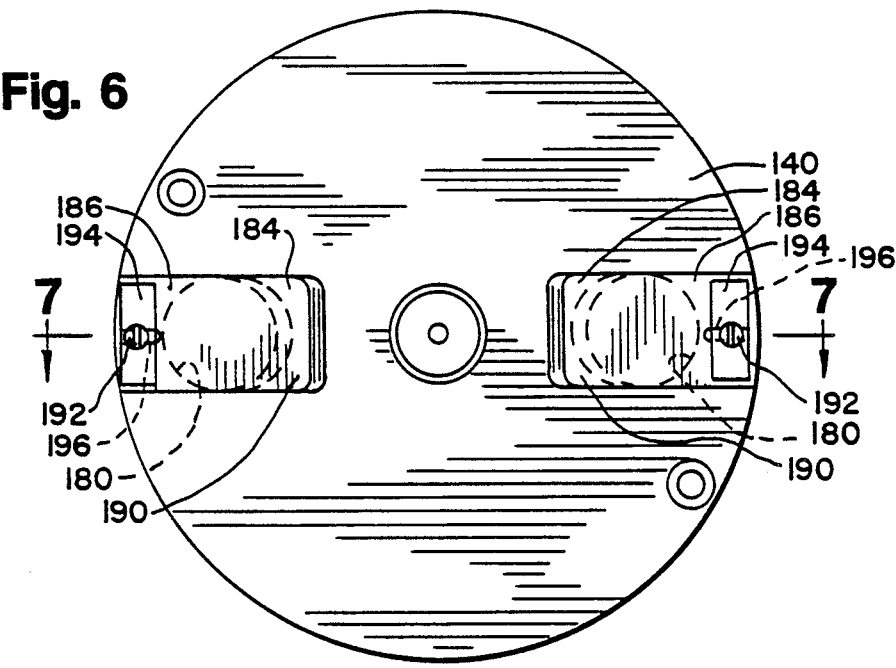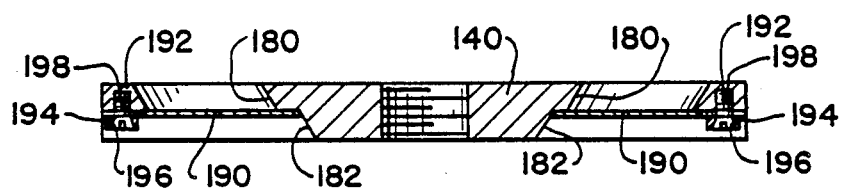

5,058,814

COFFEE GRINDER

CROSS-REFERENCE TO RELATED APPLICATION

This application is a continuation-in-part of copending U.S. patent application Ser. No. 07/394,553 filed Aug. 16, 1989, now U.S. Pat. No. 4,967,649 for COFFEE GRINDER.

BACKGROUND OF THE INVENTION

As disclosed in the copending application noted above, an improved grinder for coffee beans is compact, rugged, and efficient, so as to be particularly useful in business offices, small restaurants, and other locations where counter space tends to be quite limited.

The improved grinder disclosed therein has a hopper, which is adapted to hold a supply of coffee beans. The hopper has an outlet for such beans. A pair of grinding burrs are mounted beneath the outlet of the hopper, in axially spaced relation to each other, for relative rotation of the burrs about a vertical axis. The burrs are arranged to grind coffee beans received from the outlet of the hopper into smaller grounds and to expel such grounds radially and horizontally between the burrs. A chamber defined by structure including an outer wall surrounding the burrs and a lower wall is disposed to receive such expelled grounds. A rotor is arranged to sweep the grounds through an outlet of the chamber.

This invention is directed to further improvements in a coffee grinder as exemplified by the improved grinder disclosed in the copending application noted above.

SUMMARY OF THE INVENTION

In many respects, a grinder according to this invention may be substantially similar to the improved grinder disclosed in the aforenoted application. However, in a grinder according to this invention, a blade mounted to the chamber-defining structure is flexible between a normal position wherein the blade closes an outlet of the coffee grounds-receiving chamber and flexed positions wherein the blade is flexed sufficiently to permit grounds to pass from such chamber through the chamber outlet. Preferably, a lower plate of the coffee grounds-receiving chamber has the chamber outlet.

It is a characteristic feature of this invention that each blade tends to break up any "chaff" in the coffee grounds-receiving chamber.

The lower plate may have two chamber outlets, in diametric opposition to each other, whereupon two such blades are provided, each blade being flexible between a normal position wherein such blade closes a given one of the chamber outlets and flexed positions described above. Preferably, the margin of each outlet of the lower wall is conforms to an oblique cylinder and defines an axis intersecting the vertical axis at an acute angle.

As in the improved grinder disclosed in the aforenoted application, a rotor is arranged to rotate about the vertical axis and to sweep in the coffee grounds-receiving chamber when rotated. However, in a grinder according to this invention, the rotor is designed to sweep grounds in such chamber against the blade or blades. The rotor may have at least one face inclined in such manner that the swept grounds tend to be downwardly pressed by such face when the rotor is rotated. Preferably, the rotor has a plurality of such faces, which are spaced circumferentially from each other, and which are inclined similarly.

The outer wall surrounding the grinding burrs may be relieved to define at least one spiral configuration. The spiral configuration counters tendencies of grounds in the chamber to rotate as an annular mass within the coffee grounds-receiving chamber. Preferably, such wall is relieved to define two such spiral configurations in diametric opposition to each other.

These and other objects, features, and advantages of this invention will be evident from the following description of a preferred embodiment of this invention with reference to the accompanying drawings.

BRIEF DESCRIPTION OF THE DRAWINGS

FIG. 2, on a slightly enlarged scale, is a sectional view of a rotor used in the grinder, as taken along a plane comprising a vertical axis of the rotor.

FIG. 3 is a fragmentary detail taken along line 3—3 of FIG. 2 in a direction indicated by arrows.

FIG. 4 is a fragmentary detail taken along line 4—4 of FIG. 2 in a direction indicated by arrows.

FIG. 5, on a smaller scale, is a perspective view of the rotor.

FIG. 6, on the scale of FIG. 2, is a bottom plan view of an outlet plate used in the grinder.

FIG. 7 is a sectional view taken along line 7—7 in FIG. 6 in a direction indicated by arrows.

DETAILED DESCRIPTION OF PREFERRED EMBODIMENT

Figure 1:
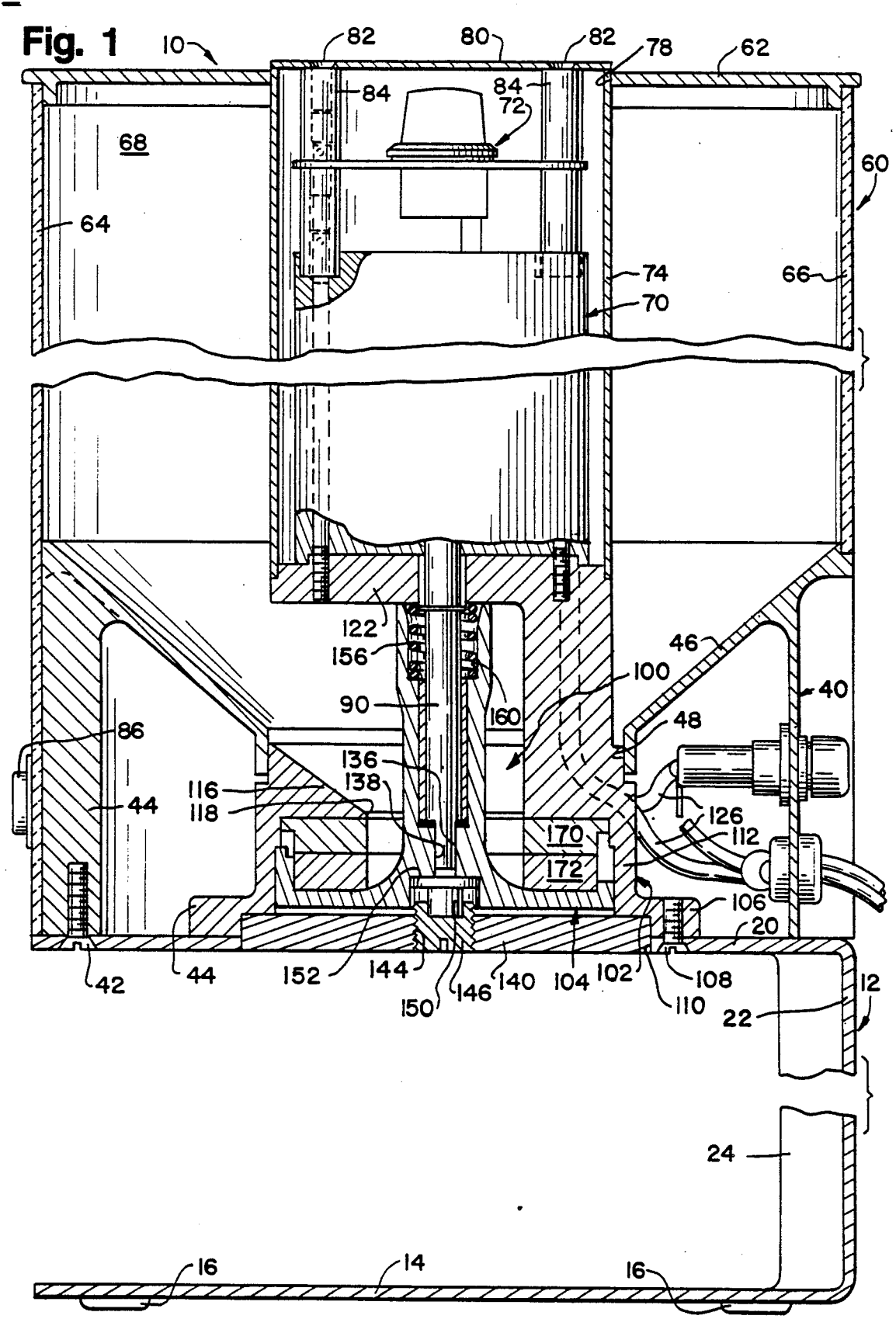
FIG. 1 is a sectional view of a grinder embodying this invention, as taken along a plane comprising a vertical axis of the grinder.
Figure 8:
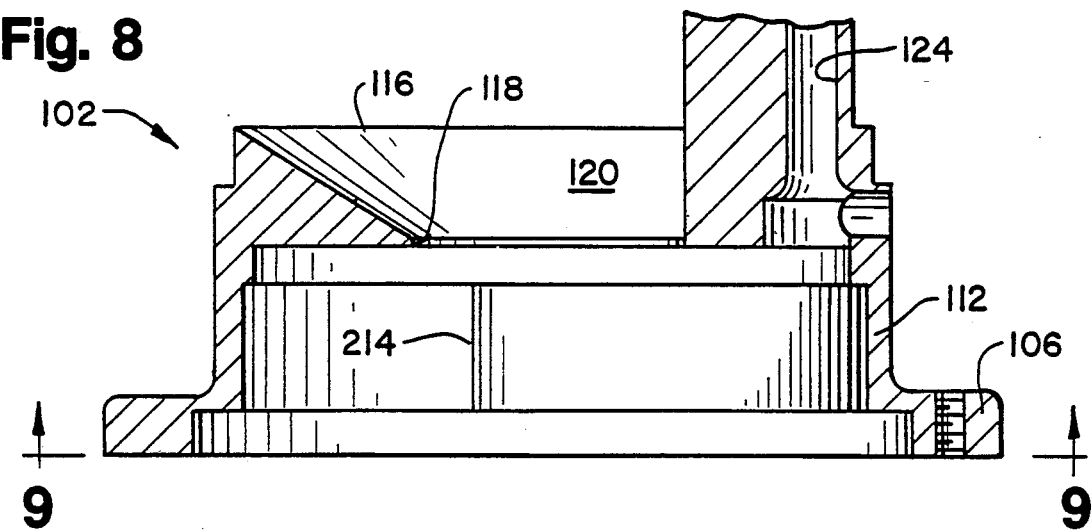
FIG. 8, on the same scale, is a sectional view of a stator used in the grinder, as taken along a plane comprising a vertical axis of the stator.

As shown, a coffee grinder 10 constitutes a preferred embodiment of this invention. The coffee grinder 10 is compact, upright, and rugged so as to be particularly useful in a business office or a small restaurant.

Except as disclosed herein, the coffee grinder 10 is similar to the coffee grinder disclosed in the aforenoted application, the disclosure of which is incorporated herein by reference.

The coffee grinder 10 comprises a base 12, which is adapted to stand the coffee grinder 10 on a firm, horizontal surface (not shown) such as a counter. The base 12 includes a lower plate 14. Skid-resistant feet 16, which are attached adhesively to the underside of the lower plate 14, engage such a surface so as to restrain the coffee grinder 10 against skidding. The base 12 also includes an upper plate 20, a back plate 22, and two side gussets 24. Only one of the side gussets 24 is shown. The back plate 22 and the side gussets 24 support the upper plate 20 above the lower plate 14.

A brew basket (not shown) of a known type may be removably clamped beneath the upper plate 20 in a manner disclosed in the aforenoted application. The brew basket receives coffee grounds from a grinding mechanism to be later described. Further description of the brew basket is found in the aforenoted application.

A box-like structure 40 is supported on the upper plate 20. The structure 40 is fastened to the upper plate 20 by screws 42 (one shown) at peripheral ears 44 (one shown) formed within the structure 40. The structure 40 has rectangular front, back, and side walls, as shown, and a top wall 46 having a large, circular, central aperture 48. The top wall 46 slopes downwardly from the upper edge of each of the front, back, and side walls of the structure 40, toward the aperture 48.

A hopper 60 for coffee beans is supported on the upper plate 20. The hopper 60 has a removable cover 62. The hopper 60 is adapted to hold a supply of coffee beans and to be substantially filled with such beans.

A front wall 64, a back wall 66, and two side walls 68 (one shown) are made, as a single piece as shown, from a suitable, transparent, polymeric material, such as polycarbonate. The cover 62 is made from similar material. Lower portions of the front wall 64, the back wall 66, and the side walls 68 engage the upper plate 20 and cover the front, back, and side walls of the structure 40. Alternatively, the front wall 64, the back wall 66, and the side walls 68 may terminate at an upper edge of the structure 40, which then forms a lower part of the hopper 60. The front wall 64, the back wall 66, and the side walls 68 are attached suitably to the structure 40. Upper portions of the front wall 64, the back wall 66, and the side walls 68 extend above the top wall 46 of the structure 40 and define the front, back, and side walls of the hopper 60. The top wall 46 of the structure 40 defines a substantial part of the bottom wall of the hopper 60. The remaining part of the bottom wall of the hopper 60 is defined by a part of the grinding mechanism to be later described.

An electrical motor 70 of a known type used in coffee grinders is mounted vertically within the hopper 60. The motor 70 is controlled by a timer 72 of a known type. The timer 72 is adjustable over a range of possible periods, e.g., from 30 seconds to 90 seconds. The timer 72 is mounted operatively in a cylindrical enclosure 74, which encloses the motor 70, on a plate 76 spaced above the motor 70. The cylindrical enclosure 74 extends through a large, circular, central aperture 78 in the removable cover 62, which fits loosely around the cylindrical enclosure 74. The cylindrical enclosure 74 has a removable cover 80, which is attached removably by screws 82 to posts 84 extending upwardly from the motor 70. Removal of the cover 80 permits access to the timer 72.

The motor 70 is actuatable via a switch 86 of a known type. The switch 86, which is mounted on the front wall of the structure 40, extends outwardly through an aperture in the lower portion of the front wall 64 covering the front wall of the structure 40. When the motor 70 is actuated, it operates for the period to which the timer 72 has been adjusted, e.g., 60 seconds, whereupon the motor 70 is deactuated by the timer 72. The switch 86 may be manually actuated so as to override the timer. Further details of the timer 72, the knob 72, and the switch 86 are unnecessary herein, since these are known components.

A vertical shaft 90 extends downwardly from the motor 70. The vertical shaft 90, which defines a vertical axis, is arranged to be rotatably driven about such axis by the motor 70.

A grinding mechanism 100 is mounted on the upper plate 20 of the base 12. The grinding mechanism 100 comprises a stator 102 and a rotor 104. The rotor 104 is driven by the motor 70, via the shaft 90, in a manner to be hereinafter described.

The stator 102 is fastened at a lower flange 106 thereof on the upper plate 20 by screws 108 (one shown) at the margin of a large, circular, central aperture 110 in such plate 20. The stator 102 has an outer wall 112 having a characteristic configuration to be later described. The stator 102 has an upper, annular, bowl-like portion 116, which is integral with the wall 112. Such portion 116, which extends radially inwardly from the wall 112, has a central aperture 118.

As mentioned above, the top wall 46 of the structure 40 defines a substantial part of the bottom wall of the hopper 60. The upper portion 116 of the stator 102 has a frusto-conical surface 120 extending to the central aperture 118 and defining the remaining part of the bottom wall of the hopper 60. The central aperture 118 defines an outlet, from which coffee beans can be vertically and gravitationally fed from the hopper 60.

The motor 70 and the enclosure 74 are mounted on a flange 122 extending from the upper portion 116 of the stator 102. The stator 102 has a vertical passageway 124 guiding electrical wires 126 connected to the motor 70.

Except as described below, the rotor 104 is similar to a rotor disclosed in Ephraim et al. U.S. Pat. No. 4,821,966, the disclosure of which is incorporated herein by reference. The rotor 104, has a lower, disc-like portion 130 and an upper, sleeve-like portion 132. The lower portion 130 has circumferentially spaced flanges to be later described. The upper portion 132 receives the shaft 90 and is keyed to the shaft 90, at a key 136 formed on the shaft 90 and fitted into a keyway 138 formed in the upper portion 132 of the rotor 104, for conjoint rotation of the rotor 104 and the shaft 90 and for axial movement of the rotor 104 along the shaft 90 within a limited range of axial movement.

The grinding mechanism 100 comprises a lower plate 140 fitting into the central aperture 110 of the upper plate 22 of the base 12. The plate 140 is fastened by screws (not shown) to the flange 106 of the stator 102. The plate 140 has a central aperture 144, which is threaded. A threaded stud 146 is threaded into the aperture 144.

A small thrust bearing 150 is mounted integrally on the threaded stud 146. A large thrust bearing 152 is seated within a downwardly opening, axial socket 154 of the rotor 104, bears against the small thrust bearing 150. A coiled spring 156 is coiled around the shaft 90 and is seated within an upwardly opening, axial socket 160 in the upper portion 132 of the rotor 104. The coiled spring 156 biases the rotor 104 downwardly along the shaft 90.

The grinding mechanism 100 comprises a pair of annular grinding burrs of known types used in coffee grinders, namely a stationary grinding burr 170 and a rotatable grinding burr 172. The pair of annular grinding burrs is similar to a pair of annular grinding burrs disclosed in Ephraim et al. U.S. Pat. No. 4,821,966.

The grinding burrs 170, 172, are mounted in axially spaced relation to each other, for relative rotation of the burrs 170, 172, about a vertical axis. The stationary grinding burr 170 is fastened by screws (not shown) to the upper portion 116 of the stator 102. The rotatable grinding burr 172, which fits within the flanges 134, is fastened by screws (not shown) to the lower portion 130 of the rotor 104.

The grinding mechanism 100 defines a coffee bean-receiving zone beneath the central aperture 118 of the upper portion 116 of the stator 102. Such zone is disposed to receive coffee beans, as fed vertically and gravitationally from the hopper 60, through the aperture 118. The annular grinding burrs 170, 172, are mounted around such zone, through which the upper, sleeve-like portion 132 of the rotor 104 extends. The lower, disc-like portion 130 of the rotor 104 defines a bottom wall of such zone.

When the rotatable grinding burr 172 is rotated by the motor via the shaft 90 and the rotor 104, the grinding burr 170, 172, grind coffee beans, as received in the coffee bean-receiving zone, into smaller grounds between the grinding burrs 170, 172. Such grounds are expelled radially and horizontally between the grinding burrs 170, 172.

The grinding mechanism 100 defines a coffee grounds-receiving chamber between the grinding burrs 170, 172, and the outer wall 112 of the stator 102. Such chamber is disposed to receive coffee grounds expelled radially and horizontally between the burrs 170, 172, and is swept by the aforenoted flanges of the lower portion 130 of the rotor 104 as the rotor 104 is rotated.

As shown in FIGS. 6 and 7, the lower plate 140 has two outlets 180 for coffee grounds, in diametric opposition to each other. The lower plate 140 closes the coffee grounds-receiving chamber except for the outlets 180. Each outlet 180 conforms to an oblique cylinder and defines an axis. The axes defined by the outlets 180 intersect the vertical axis of relative rotation of the grinding burrs 170, 172, at acute angles.

Each outlet 180 opens downwardly into a notch 182 extending radially and defining a small marginal area 184 inward of such outlet 180 in a radial sense and a larger marginal area 186 outward of such outlet 180 in a radial sense. In each notch 182, a blade 190 is mounted via a screw 192 and a retainer 194. The screw 192 passes through a suitable aperture 196 in the retainer 194, and through a notch 196 in the blade 190, and is threaded into a threaded socket 198 in the lower plate 140.

Each blade 190 is made from spring steel. Each blade 190 is flexible between a normal position wherein such blade 190 closes the associated outlet 180 and flexed positions wherein such blade 190 is flexed sufficiently to permit grounds to pass from the coffee ground-receiving chamber through the associated outlet 180. It is a characteristic feature of this invention that the blades 190 tend to retain the swept grounds for a sufficient time to break up any "chaff" in the coffee grounds-receiving chamber.

As shown in FIGS. 2 through 5, the circumferentially spaced flanges of the rotor 104 include three taller flanges 200 having inclined faces 202 and three shorter flanges 204 having inclined faces 206, in an alternating pattern and in circumferentially spaced relation to one another. Each of the inclined faces 202, 206, is inclined by a similar angle of about 45° so that the grounds swept by the flanges 200, 204, in the coffee grounds-receiving chamber tend to be downwardly pressed by the inclined faces 202, 206, against the blades 190.

If sufficient grounds are present in the coffee grounds-receiving chamber, the grounds swept by the flanges 200, 204, are pressed downwardly with sufficient force to flex each blade 190 from its normal position to a flexed position of such blade 190, thereby to permit some of the swept grounds to pass through the associated outlet 180. As mentioned above, the blades 190 tend to retain the swept grounds for a sufficient time to break up any "chaff" in the coffee grounds-receiving chamber.

Figure 9:
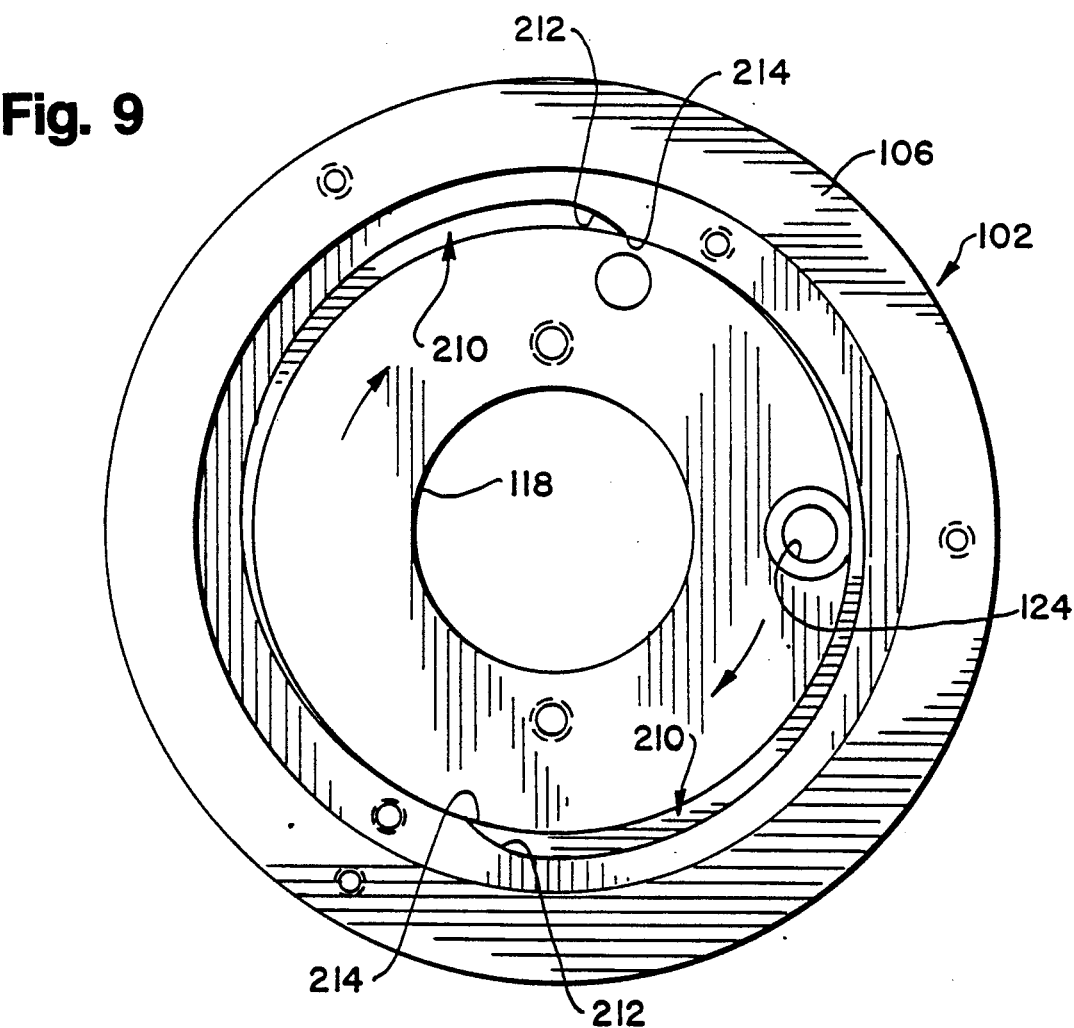
FIG. 9 is a bottom plan view taken along line 9—9 of FIG. 8, in a direction indicated by arrows.

As shown in FIG. 9, the outer wall 112 of the stator 102 is relieved to define two similar, spiral configurations 210 in diametric opposition to each other. The spiral configurations 210 counter tendencies of the grounds being swept by the rotor 104 to rotate as an annular mass within the coffee grounds-receiving chamber.

The spiral configurations 210 are defined where the outer wall 112 has radii increasing gradually from a minimum radius, in a direction indicated by curved arrows in FIG. 9, except at terminal portions 212 where the spiral configurations have radii decreasing abruptly to the minimum radius. The outer wall 112 has the minimum radius at two locations 214 in diametric opposition to each other. Thus, the spiral configurations 210 allow a mass of grounds being swept in the grounds-receiving chamber to expand radially until the mass reaches the terminal portions 212, which tend to break-up the mass.

It may be thus seen that, as compared to prior coffee grinders, the coffee grinder 10 embodies significant improvements. Various modifications may be made in the coffee grinder 10 without departing from the scope and spirit of this invention.

We claim:

1. A grinder for grinding coffee beans into smaller grounds, the grinder comprising:
   (a) a hopper adapted to hold a supply of coffee beans, the hopper having an outlet for such beans;
   (b) a pair of grinding burrs mounted beneath the outlet of the hopper, in axially spaced relation to each other, for relative rotation of said burrs about a vertical axis, said burrs being arranged to grind beans received from the outlet of the hopper into smaller grounds and to expel such grounds radially and horizontally between said burrs;
   (c) means defining a chamber, which includes an outer wall surrounding said burrs, a lower plate, and at least one outlet, for receiving such expelled grounds;
   (d) outlet-closing means, which includes a blade mounted to the chamber-defining means and flexible between a normal position wherein the blade closes the outlet and flexed positions wherein the blade is flexed sufficiently to permit grounds to pass from the chamber through the chamber outlet, for closing the chamber outlet until grounds in the chamber are pressed against the blade with sufficient force to flex the blades from the normal position to such a flexed position; and
   (e) sweeping means, which includes a rotor arranged to rotate about said vertical axis and to sweep in the chamber when rotated, for sweeping grounds in the chamber in such manner that the swept grounds are against the blade.

2. The grinder of claim 1 wherein the lower plate has the outlet.

3. The grinder of claim 2 wherein the rotor has at least one face inclined such that the swept grounds tend to be downwardly pressed against the blade by said face when the rotor is rotated.

4. The grinder of claim 3 wherein the rotor has a plurality of inclined faces, each face being inclined such that the swept grounds tend to be downwardly pressed against the blade by said faces when the rotor is rotated.

5. The grinder of claim 2 wherein the chamber outlet of the lower plate is configured such that grounds passing from the chamber through the outlet of the lower plate tend to be downwardly and radially directed.

6. The grinder of claim 5 wherein the outlet of the lower wall conforms to an oblique cylinder and defines an axis intersecting the vertical axis at an acute angle.

7. The grinder of claim 5 wherein the lower plate has two such outlets, in diametric opposition to each other, and the outlet-closing means includes a blade in each outlet, each blade being flexible between a normal position wherein such blade closes a given one of the outlets of the lower plate and flexed positions wherein such blade is flexed sufficiently to permit grounds to pass from the chamber through the same one of the outlets of the lower plate.

8. The grinder of claim 7 wherein each outlet of the lower plate is cylindrical and defines an axis intersecting the vertical axis at an acute angle.

9. The grinder of claim 1 wherein the outer wall is relieved to define at least one spiral configuration constituting means for countering tendencies of grounds in the chamber to rotate as an annular mass.

10. The grinder of claim 9 wherein the outer wall is relieved to define two such spiral configurations in diametric opposition to each other.

11. The grinder of claim 7 wherein the outer wall is relieved to define two spiral configurations in diametric opposition to each other, the spiral configurations constituting means for countering tendencies of grounds in the chamber to rotate as an annular mass.

* * * * *